United States Patent [19]
Vepy

[11] Patent Number: 6,098,957
[45] Date of Patent: Aug. 8, 2000

[54] ELECTRO-MECHANICAL TORQUE LIMITER FOR VALVE ACTUATORS

[75] Inventor: Tamas A. Vepy, Willowdale, Canada

[73] Assignee: Honeywell Inc., Minneapolis, Minn.

[21] Appl. No.: 09/126,902

[22] Filed: Jul. 31, 1998

[51] Int. Cl.[7] .................................................. F16K 31/04
[52] U.S. Cl. ..................................... 251/129.12; 137/875
[58] Field of Search .......................... 251/129.12, 129.13, 251/129.11; 137/872, 875, 876; 74/412 TA

[56] References Cited

U.S. PATENT DOCUMENTS

| | | | |
|---|---|---|---|
| 1,747,594 | 2/1930 | Panish | 251/129.12 |
| 1,856,927 | 5/1932 | Panish | 251/129.12 |
| 2,203,233 | 6/1940 | Panish | 251/129.12 |
| 2,598,062 | 5/1952 | Krecan | 251/129.12 |
| 3,255,636 | 6/1966 | Wehrli | 251/129.12 X |
| 3,311,121 | 3/1967 | Morrell | 137/243.6 |
| 4,346,728 | 8/1982 | Sulzer | 137/243.6 |
| 4,463,980 | 8/1984 | Vamvakas | 251/129.12 |
| 4,474,078 | 10/1984 | Denkowski et al. | 74/625 |
| 4,715,580 | 12/1987 | Mueller | 251/129.12 X |
| 4,875,504 | 10/1989 | Nicholson | 251/129.12 X |
| 5,052,424 | 10/1991 | Zerndt et al. | 251/129.12 X |
| 5,085,401 | 2/1992 | Botting et al. | 251/129.12 X |
| 5,131,623 | 7/1992 | Giordani | |
| 5,174,546 | 12/1992 | Giordani | |
| 5,176,037 | 1/1993 | Kasprzyk | |
| 5,426,353 | 6/1995 | Stuhr et al. | |

*Primary Examiner*—John Rivell
*Attorney, Agent, or Firm*—Edward L. Schwarz

[57] ABSTRACT

A valve apparatus used in heating and cooling systems in which a valve housing, a valve element, a drive mechanism, and a torque limiting mechanism operate to open and close the valve element between different ports to allow fluid flow through the flow passage within the valve. A torque limiting mechanism comprising a spring limits the amount of torque required by the motor by using energy stored in the spring to assist in maintaining the valve element in a closed position, or to maintain the valve element in an intermediate position for the regulation of flow through the valve flow passage in both mixing and diverting applications. The valve mechanism includes a motor driven mechanism with a de-energizing circuit to stop the rotation of the motor upon the motor driven mechanism applying a predetermined amount of compression to the spring. The compressed spring exerting a substantially equal force to the valve element for closing the different ports.

18 Claims, 6 Drawing Sheets

ELECTRO-MECHANICAL TORQUE LIMITER FOR VALVE ACTUATORS

BACKGROUND OF THE INVENTION

1. Field of the Invention

This invention relates to an electromechanical torque limiter for actuators and zone valves in heating, cooling and ventilation systems.

2. Description of Related Art

Heating and cooling systems typically employ hydronic valves or damper valves (or other devices to be actuated) with actuators to control the flow of fluid such as water, air, or gas to specific zones of a heating and air conditioning system and are usually referred to as zone valves. Typically, the zone valves are actuated to affect environmental conditions in specific zones in response to thermostats distributed throughout the heating and air conditioning system.

Conventional zone valves are actuated by an electric motor that opens or closes the valve in one direction while a spring mechanism assists in closing or opening the valve in the opposite direction. These motorized conventional valves rotate the valve element to its closed position by rotating a motor shaft through a gear mechanism. The shaft rotates a ball valve element, or a vane element, to its open or closed positions in the case of hydronic valves or damper valves, respectively. The valve is maintained in a closed position by continuously energizing the motor and applying a closing force to the valve element through the torque developed in the motor shaft.

In conventional zone valves, as the valve element moves from an open/closed position to a closed/open position, a return assist spring is tensioned so that the energy stored in the spring assists the valve element return to its previous position. Because these valves rely on the torque developed in the motor shaft to maintain the valve element in a closed/open position if the motor is simply de-energized the tensioned spring will return the valve element to its previous state, thus opening/closing the valve. It can be seen that in heating and air conditioning systems utilizing conventional motorized zone valves, the motor must be continuously energized in order to keep the valve port closed/open.

Motorized zone valves may have two or more ports. Zone valves incorporating multiple ports generally do not apply evenly distributed forces to the valve element. In one direction a motor is used to apply a closing force to the valve element and to tension a return assist spring. The shaft rotates the valve element from an open to a closed position against a first valve seat, the motor being continuously energized to maintain the valve port closed. When the motor is de-energized, the valve element utilizes the energy stored in the tensioned spring to apply a closing force against a second valve seat at a second port.

Conventional motorized zone valves relying on continuously energized motors to apply a closing force to a valve element against a first valve seat and relying on spring forces for applying a closing force to the valve element against a second valve seat suffer several disadvantages.

First, energy is wasted and the life expectancy of a motor is greatly reduced because the motor is generally stalled in its operation in order to maintain a continuous closing force against the valve seat.

Second, closing forces translated to a valve seat will fluctuate as the electrical power fluctuates in the electrical system, causing fluctuations in the amount of torque developed at the motor shaft. Manufacturing tolerances and component wear also affect the maintenance of closing forces without fluctuations.

Third, it is difficult to achieve symmetrical valve element closing forces acting against a first and a second valve seat because of the different mechanisms used to apply the closing forces, e.g. torque developed by the motor on one valve seat and spring force on the other valve seat.

Fourth, a motor in a conventional zone valve cannot be de-energized because it must apply a continuous closing force against the valve element to overcome the force stored in the spring and the upstream port pressure in the heating, cooling and ventilation system. Thus, if the motor is de-energized, the valve element will tend towards opening the valve port instead of maintaining a tight seal. In addition, the valve element cannot be maintained in a partial stroke position to modulate flow in mixing applications.

Fifth, conventional zone valve actuators cannot compensate for dimensional tolerance variations caused by heat expansion, contraction, and seating of elastomeric materials.

Therefore, it can be seen that there is a need for a zone valve apparatus having an electromechanical torque limiter that provides energy savings by allowing a motor to be de-energized after a predetermined valve element closing force is achieved and maintaining a constant closing force against the ball valve element without requiring the motor to be energized.

It can also be seen that there is a need for an electromechanical torque limiter for a zone valve actuator that is not affected by voltage variations, component wear or manufacturing tolerances.

It can also be seen that there is a need for a zone valve apparatus having an electromechanical torque limiter which allows the application of symmetrical closing forces to a valve element acting against a first valve seat and subsequently acting on a second valve seat. It can also be seen that there is a need for a zone valve apparatus having an electromechanical torque limiter that provides a self locking gear mechanism to hold the valve element in a partial stroke position within the valve housing for providing flow modulation in mixing applications without the need for additional components.

It can also be seen that there is a need for a zone valve apparatus having an electromechanical torque limiter to compensate for dimensional variations caused by heat expansion, contraction, and compression setting of elastomeric materials.

SUMMARY OF THE INVENTION

To overcome the limitations in the prior art described above, and to overcome other limitations that will become apparent upon reading and understanding the present specification, the present invention discloses an improved apparatus and method for actuating a valve using an electromechanical torque limiter in conjunction with a self locking torque converter.

In one embodiment, the present invention discloses a valve apparatus comprising a valve housing having a valve seat and a flow passage therethrough, a valve element moveable within the housing between an open position, in which fluid flow may occur through the flow passage, and a first closed position seated against the ball valve element, in which fluid flow is blocked through the flow passage. A drive mechanism is operatively connected to the valve element for moving the valve element between the open and closed positions, the drive mechanism including a motor for driving the mechanism, and a torque limiting mechanism operatively coupled to the drive mechanism and the valve element, the torque limiting mechanism applying a closing force to the valve element when the ball valve element is seated against the valve seat.

Further in one embodiment, the drive mechanism includes a shaft having a first end and a second end, the first end operatively coupled to the motor.

Still in one embodiment, the drive mechanism further includes a gear assembly operatively coupled between the motor and the first end of the shaft for providing rotational and translational motion along the axial length of the shaft.

Yet in one embodiment, the torque limiting mechanism includes at least one spring, the spring configured to provide the closing force to the valve element.

Further in one embodiment, the torque limiting mechanism further includes a sensor for sensing shaft displacement, the sensor controlling operation of the drive mechanism based on sensed shaft displacement.

Still in one embodiment, the sensor comprises a plate fixedly mounted to the shaft adjacent to the second end thereof and at least one limit switch, the limit switch being engageable with the plate.

Yet in one embodiment, said sensor further includes a second limit switch engageable with the plate.

In another embodiment, the torque limiting mechanism includes a first axial stop element disposed along the shaft and a first sleeve slideably movable along a portion of the shaft, the first sleeve arranged to slide into and out of the first axial stop element, the first axial stop element and the first sleeve operatively arranged with the spring to store energy in the spring by compressing the spring.

Further in another embodiment, a second axial stop element disposed along the shaft and a second sleeve element slideably movable along a portion of the shaft, the second sleeve arranged to slide into and out of the second axial stop element, the second axial stop element and the second sleeve operatively arranged with the spring to store energy in the spring by compressing the spring.

Still in another embodiment, the spring is disposed between the first and second sleeves, the first sleeve compressing the spring in one direction and the second sleeve compressing the spring in the opposite direction.

In still another embodiment, the drive mechanism includes a gear assembly operatively coupled between the shaft and the valve element.

Further in still another embodiment, the gear assembly includes at least one worm screw connected to the shaft and at least one worm gear disposed on the valve element, and the worm screw operatively coupled to the worm gear.

In yet another embodiment, the valve housing further comprises a second flow passage and a second valve seat, and the valve element is movable within the housing between the open position and a second closed position seated against the second valve seat, in which fluid flow is blocked through the second flow passage, and the valve element is movable by the drive mechanism between the open position and the second closed position.

Further in yet another embodiment, the torque limiting mechanism applies a closing force to the valve element when the valve element is seated against the second valve seat.

The present invention also provides a valve assembly comprising a valve housing means having a flow passage extending therethrough, flow control means for controlling flow through the flow passage, the flow control means being movable between an open position allowing fluid flow through the flow passage and a closed position in which fluid flow through the flow passage is prevented, drive means engaged with the flow control means for moving the flow control means between the open and closed position, and torque limiting means applying a closing force to the flow control means when the flow control means is at the closed position.

DETAILED DESCRIPTION OF THE PREFERRED EMBODIMENT

In the following description of the exemplary embodiment, reference is made to the accompanying drawings which form a part hereof, and in which is shown by way of illustration a specific embodiment in which the invention may be practiced. It is to be understood that other embodiments may be utilized as various changes may be made without departing from the scope of the present invention.

Figure 1:
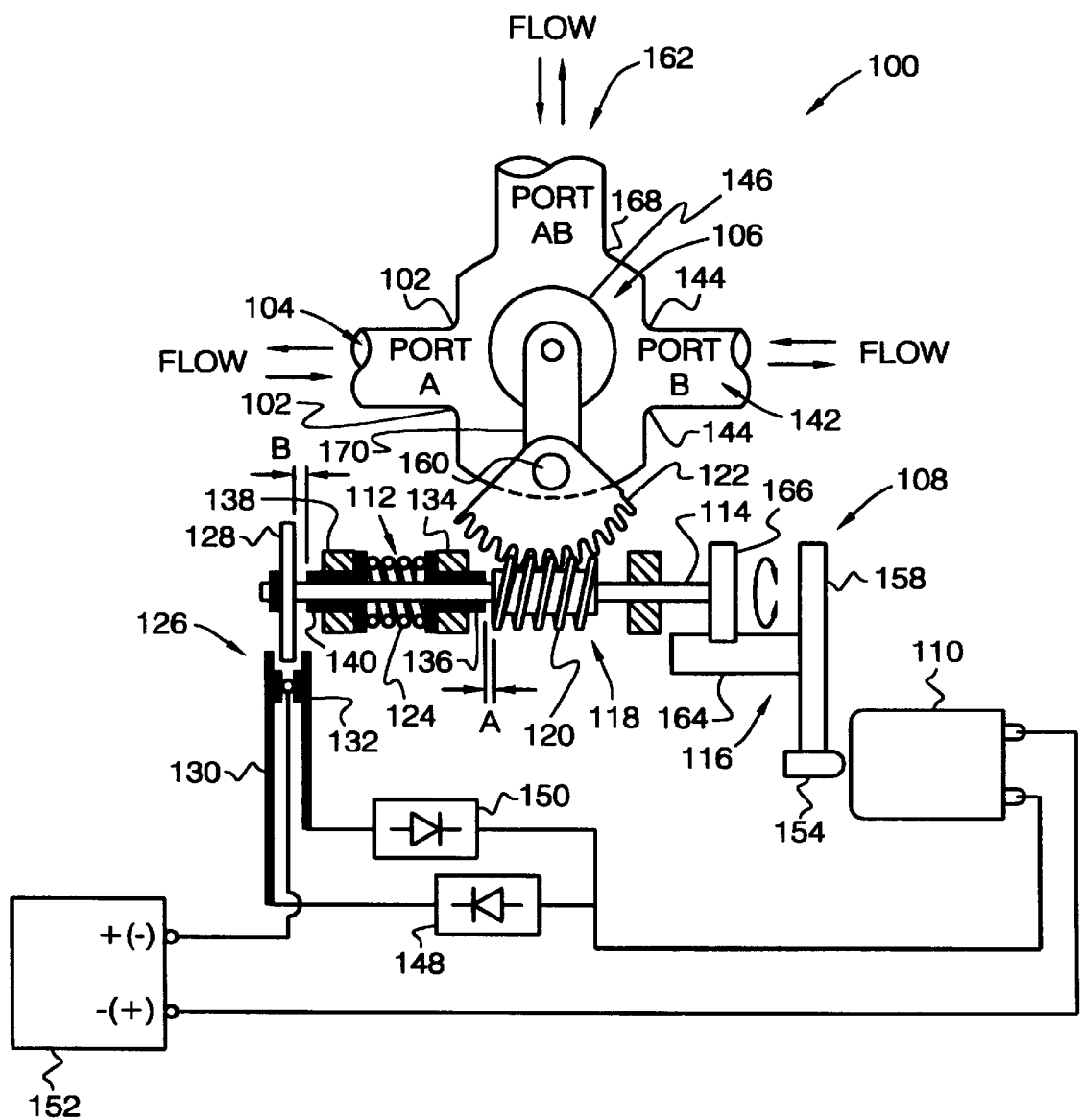
FIG. 1 illustrates a three-way hydronic valve apparatus in an open position comprising an electro-mechanical torque limiter for a valve actuator.

FIG. 1 illustrates a three-way hydronic valve apparatus 100, in accordance with the present invention. A valve housing 168 having a valve element 106 and flow passages comprising Port A 104, Port B 142, and Port AB 162 therethrough. The valve element 106 comprising a valve element crank arm 170 having a first end coupled to a ball valve element 146 and a second end coupled to a worm gear 122. The valve element 106 is located within the housing 168 and is moveable about pivot point 160 between a valve seat 102 at Port A 104 and a valve seat 144 at Port B 142. The valve element 106 is shown in an open position, in which case air or fluid flow may occur in any direction through the flow passages at Port A 104, Port B 142, and Port AB 162.

It is appreciated that many other valve elements may be used besides a ball valve element 146 without departing from the spirit of the present invention. Valve elements such as rotary, linear, damper, or any of a variety of zone valves for controlling fluid flow of water, air, gases, or any other medium to separate zones throughout a heating, cooling, and ventilation system.

A torque converter drive mechanism 108 is operatively connected to the valve element 106 for moving the valve element 106 between the valve seat 102 at Port A 104 and the valve seat 144 at Port B 142. The drive mechanism 108 also includes a motor 110 for driving the drive mechanism 108 and a torque limiting mechanism 112 that is operatively coupled to the drive mechanism 108 and the valve element 106. The torque limiting mechanism 112 applies a closing force to the valve element 106 when the ball valve element 146 is seated against valve seats 102 or 144 at Port A 104 or Port B 142, respectively. The drive mechanism 108 also includes a shaft 114 having a first and second end. The shaft 114 is operatively coupled to the motor 110 via a gear assembly 116. The gear assembly 116 may be a transfer gear assembly, which is well known in the art for providing translational motion based on a rotational motion. Gear assembly 116 comprises a first gear 166 coupled to a second gear 164 which is coupled to a third gear 158. The first gear 166 rotates and translates on the second gear 164 which is rotated by the third gear 158. The third gear 158 is coupled to a fourth gear 154 mounted on a motor spindle. The first end of the shaft 114 is coupled to the first gear 166 of the gear assembly 116. The first gear 166 rotates and translates the shaft 114 along its axial length.

The torque limiting mechanism 112 comprises a spring 124 configured to provide a closing force to the valve element 106. The torque limiting mechanism 112 further comprises a sensor arrangement 126 for sensing displacement of the shaft 114. The sensor arrangement 126 controls the operation of the drive mechanism 108 based on sensed shaft displacement. The sensor arrangement comprises a plate 128 which is fixedly mounted adjacent to the second end of the shaft 114. A first limit switch 130 is engaged with the plate 128 as the shaft 114 is displaced in a first direction from right to left and a second limit switch 132 is engaged with the plate as the shaft 114 is displaced in an opposite direction, from left to right.

The torque limiting mechanism 112 also includes a first and second axial stop elements 134, 138, respectively, disposed along the shaft 114, and are fixed relative to the shaft 114. A first and second flanged sleeve 136, 140, respectively, are slideably movable along a portion of the shaft 114. The first flanged sleeve 136 is arranged to rotate and slide into and out of the first axial stop element 134, and a clearance distance "A" may exist between the worm screw 120 and the first flanged sleeve 136. The second flanged sleeve 140 is arranged to rotate and slide into and out of the second axial stop element 138, and a clearance distance "B" may exist between the end plate 128 and the second flanged sleeve 140. The first and second axial stop elements 134, 138 are operatively arranged with the first and second flanged sleeves 136, 140, respectively, to compress and store energy in the spring 124. The spring 124 is captivated between the first and second flanged sleeves 136, 140 and may be compressed such that the first and second flanged sleeves 136, 140, are held apart by the spring 124. The spring 124 may be further compressed by the first flanged sleeve 136 as the shaft 114 is displaced in the first direction and may be compressed by the second flanged sleeve 140 as the shaft 114 is displaced in the opposite direction.

A gear assembly 118 is operatively coupled between the shaft 114 and the valve element 106. The gear assembly 118 comprises a worm screw 120 connected to the shaft 114 and to a worm gear 122 disposed on the valve element 106. The worm screw 120 is operatively coupled to the worm gear 122 such that the worm screw 120 rotates and translates in conjunction with the shaft 114 to move the valve element 106 about the pivot point 160 from an open position, as shown in the figure, toward a first closed position at Port A 104 (FIG. 2) as the shaft 114 and the worm screw 120 rotate in a clockwise manner and translate in the first direction. The torque limiting mechanism 124 applies a closing force to the valve element 106 when the ball valve element 146 is seated against the valve seat 102.

The valve element 106 may also move from the first closed position at Port A 104 to an open position in between and subsequently toward a second closed position at Port B 142 (FIG. 3) as the shaft 114 and the worm screw 120 rotate in a counter-clockwise manner and translate in the opposite direction. The torque limiting mechanism 124 applies a closing force to the valve element 106 when the ball valve element 146 is seated against the valve seat 144.

It is appreciated that many other arrangements may be used to rotate and translate the drive mechanism to effect the movement of the valve element 106 and close flow passages at Ports A and B, 104, 142, respectively.

The motor 110 may be a DC or an AC motor. For DC motors, a first diode 148 and a second diode 150 are utilized in conjunction with an electric motor power supply 152 to determine which limit switch 130 or 132 corresponds to a certain motor rotation, e.g. clockwise or counter-clockwise. Once a limit switch is opened the motor 110 starts in the opposite direction by reversing the polarity of the power supply 152. In the reverse direction, current will flow through the other, still closed, limit switch.

The preferred embodiment of the present invention may also utilize a bi-directional AC motor. For bi-directional AC motors, a separate input terminal is provided in series with limit switches 130 and 132, to operate the motor 110 in a reverse direction. Direction reversal occurs if the separate terminal becomes energized via a third wire(not shown) or if the sequence of coil energizing signals is reversed. It is appreciated that many other types of motors such as stepper motors may also be used. It is also appreciated that many other arrangements for controlling the operation of the motor 110 may be used without departing from the spirit of the invention.

Figure 2:
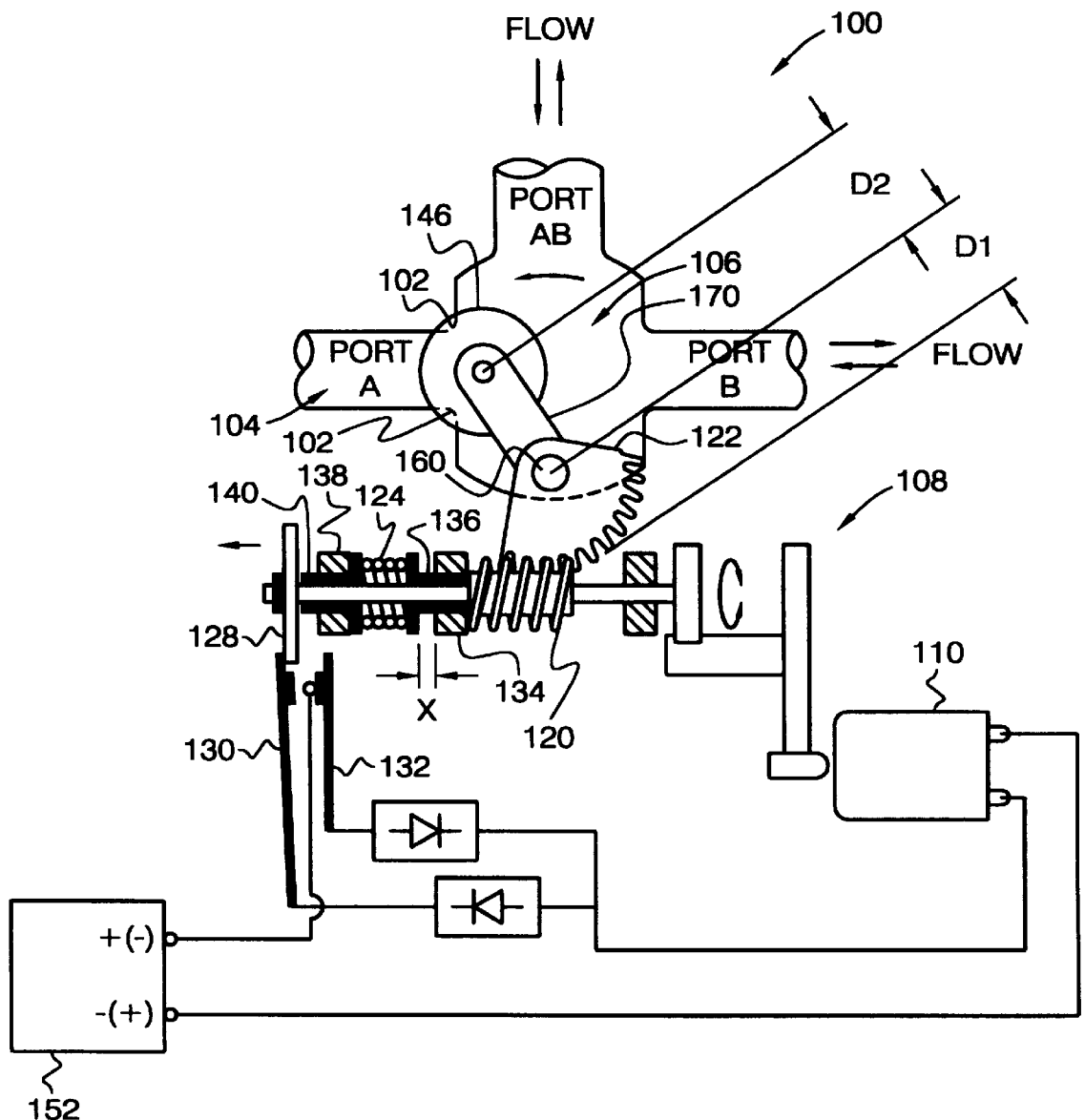
FIG. 2 illustrates the three-way valve apparatus of FIG. 1 in a first closed position.

FIG. 2 illustrates the three-way hydronic valve apparatus 100, in accordance with the present invention, in a first closed position closing off the flow passage at Port A 104. The ball valve element 146 has moved from an open position to a closed position, seated against the first valve seat 102. Upon the ball valve element 146 contacting the first valve seat 102, the worm gear 122 coupled to the valve element 106 stops rotating. Subsequently, the motor driven worm screw 120 continues translating on the stationary worm gear 122. After translating for a distance "A" (FIG. 1), the worm screw 120 contacts the first flanged sleeve 136 slidably disposed within the first axial stop element 134 and begins compressing the spring 124. The spring 124 is compressed against the second flanged sleeve 140, which is at rest against the second axial stop element 138, until a preset spring compression force limit is reached. At this point, the end plate 128 opens the first limit switch 130 and interrupts the drive mechanism 108 by disconnecting the power supply 152 to the motor 110.

The translated distance "X" corresponds to a predetermined spring force compression limit. The spring compression force is adjustable by selecting different spring elements, by adjusting the displacement distance "X", by varying the spring captivation length, or all of the above. The energy stored in the compressed spring 124, the reaction force, is modified through the worm gear 122 and the valve element crank arm 170 thus applying a seating force against the valve element 106 to close the flow passage at Port A 104 by a force equal to the product of the ratio of "D1"/"D2" and the spring force. The distance D1 is roughly the distance from the pivot point 160 to the edge of the worm gear 122 and "D2" is roughly the distance from the pivot point 160 to the center of the ball valve element 146.

It is appreciated that the axial shaft displacement "X" may be adjusted according to a spring compression force limit required in a particular application.

It is also appreciated that other mechanical limit switch elements or solid state inductive, magnetic, or photoelectric proximity sensing limit switch elements capable of sensing shaft displacement may be utilized in place of limit switches 130 and 132 and the plate 128 without departing from the spirit of the invention.

Figure 3:
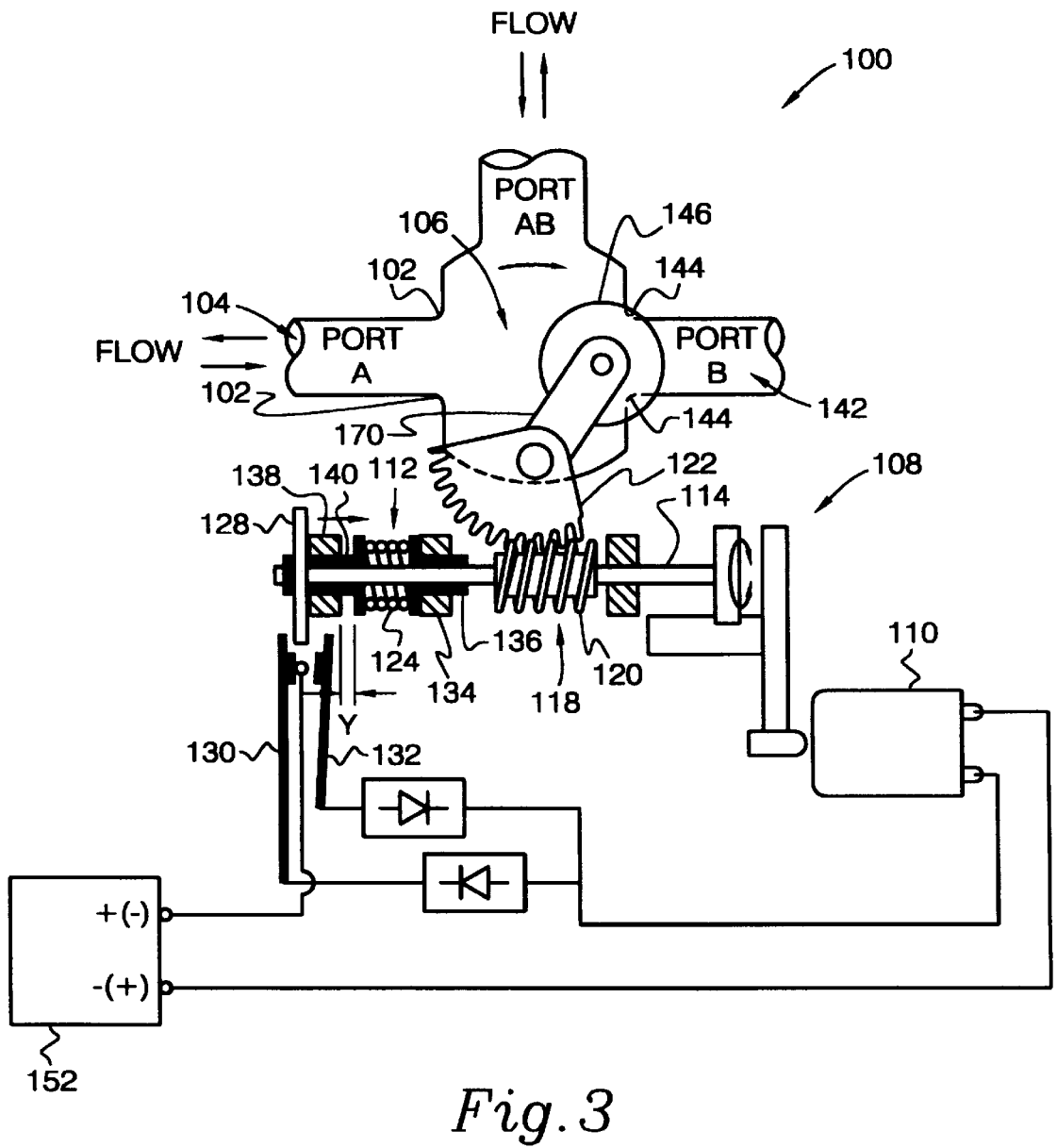
FIG. 3 illustrates the three-way valve apparatus of FIG. 1 in a second closed position.

FIG. 3 illustrates the three-way hydronic valve apparatus 100, in accordance with the present invention, in a second closed position closing off the flow passage at Port B 142. The motor 110 may be driven in the reverse direction to translate the shaft 114 in the reverse direction, thus rotating the ball valve element 146 from the valve seat 102 at Port A 104 towards the Port B 142 until the ball valve element 146 contacts the valve seat 144 at Port B 142. Upon the ball valve element 146 contacting the second valve seat 144, the worm gear 122 coupled to the valve element 106 stops rotating. Subsequently, the motor driven worm screw 120 continues translating on the stationary worm gear 122. After translating for a distance "B" (FIG. 1), the end plate 128 contacts the second flanged sleeve 140, slidably disposed within the second axial stop element 138, and begins compressing the spring 124. The spring 124 is compressed against the first flanged sleeve 136, which is at rest against the first axial stop element 134, until a pre-set spring compression force limit is reached. At this point, the end plate 128 opens the second limit switch 132 and interrupts the drive mechanism 108 by disconnecting the power supply 152 to the motor 110.

The translated distance "Y" corresponds to a predetermined spring force compression limit. The spring compression force is adjustable by selecting different spring elements, by adjusting the displacement distance "Y", by varying the spring captivation length, or all of the above. The energy stored in the compressed spring 124, the reaction force, is once again modified through the worm screw 120 and the valve element crank arm 170 thus applying a seating force against the valve element 106 to close the flow passage at Port B 142 by a force equal to the product of the ratio of "D1"/"D2" (FIG. 2) and the spring force.

Due to the inherent symmetry of this mechanism, it is appreciated that if the distance "Y" is made equal to the distance "X" (FIG. 2), an equal valve seat closing force may be applied to the ball valve element 146 to act at valve seats 102, 144 at Port A or Port B, 104, 142, respectively, to close either flow passage, the equal ball valve element closing forces being controlled by a single compression spring 124.

Upon reaching a predetermined spring compression force limit, the motor 110 is de-energized, thus saving energy and increasing the life and reliability of the motor 110. The operation of the torque limiting mechanism 112 permits the use of a less expensive motor 110 for the drive mechanism 108.

An advantage of the preferred embodiment of the present invention is that this mechanism is able to compensate port closing forces due to heat dilations when the valve body temperature changes without the need to energize the motor.

A further advantage of the preferred embodiment of the present invention is that the closing forces applied to the valve element 106 are not affected by varying torque output of the motor 110 resulting from power supply 152 voltage variations because the motor 110 is de-energized once the appropriate valve closing force is achieved. Closing force is also not affected by component wear, manufacturing tolerance, or compression setting of elastomeric valve seal materials because the spring 124 maintains a constant closing force against the valve element 106.

Additionally, the gear assembly 118 is self locking and thus may hold the valve element 106 in any partial stroke position between open and closed positions, thus enabling the modulation of air or fluid flow through the flow passages of the three-way hydronic valve apparatus 100 without the use of additional components. Accordingly, the preferred embodiment of the present invention is a very cost-effective solution for zone valve applications.

As the ball valve element moves from one valve port to another, there are minimal frictional losses in the motor and power transmission due to the absence of port closing and counteracting spring forces. During this stage of translation, the motor is said to be "cruising" with substantially zero outward axial force experienced by the motor. Under these operating conditions, the motor does not experience excessive wear and does not consume excessive electrical power.

Figure 4A:
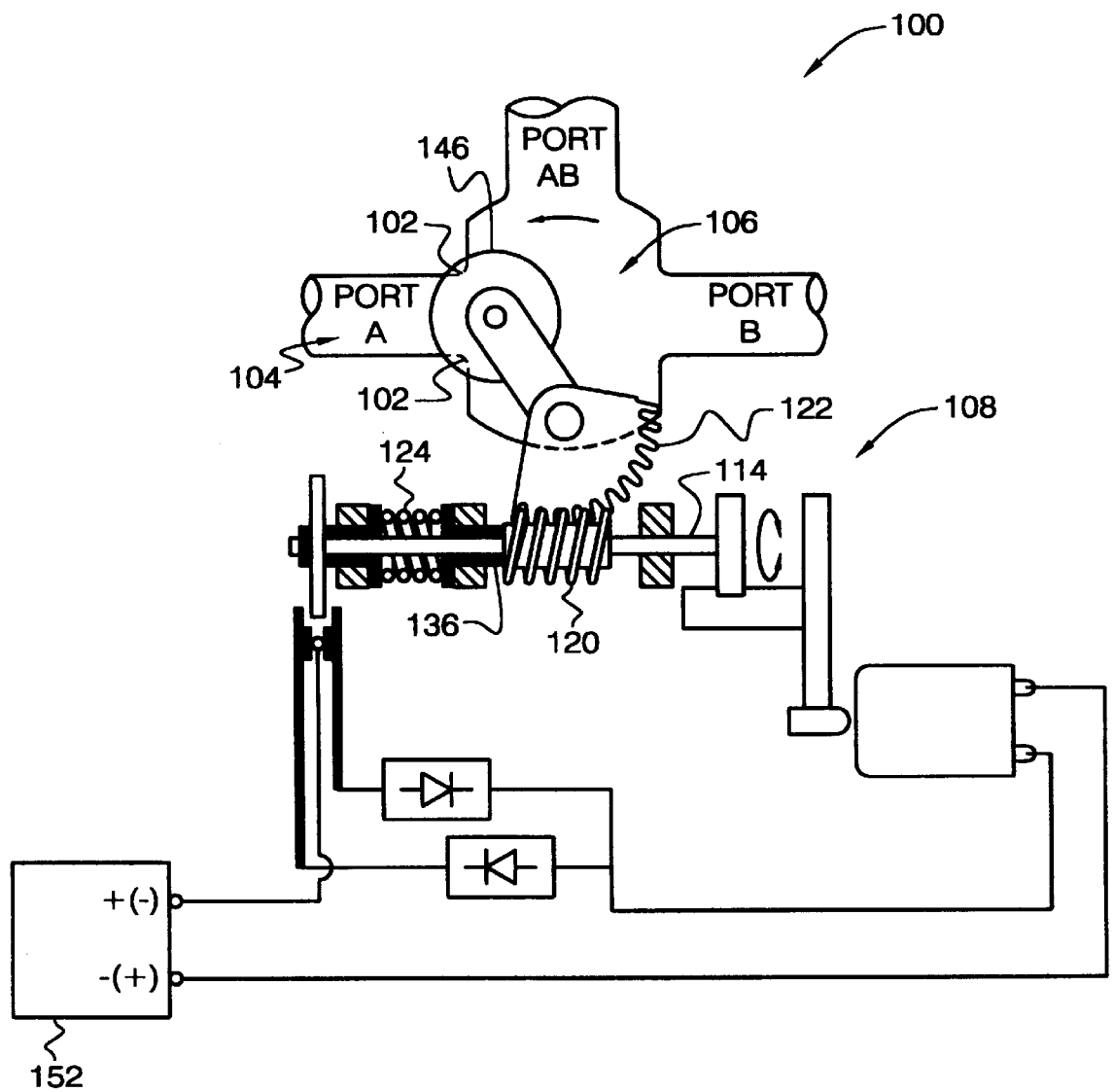
FIGS. 4A and 4B illustrate electromechanical torque limiters for valve actuators showing a valve element gear assembly upon engaging a spring element and subsequently compressing the spring element.

FIG. 4A illustrates the three-way valve apparatus 100 at a point when the ball valve element 146 initially contacts the valve seat 102 at Port A 104. At this point, based on the spring force required by the application, there may be no physical contact between the worm screw 120 and the first flanged sleeve 136 resulting in no additional compression force being applied to the spring 124 by the drive mechanism 108. However, in the preferred embodiment of the present invention, at substantially the same instant the ball valve element 146 makes initial contact with the valve seat 102, the worm screw 120 makes initial contact with the first flanged sleeve 136, thus eliminating the gap "A" (FIG. 1) between the worm screw 120 and the first flanged sleeve 136. When the ball valve element 146 is seated against the valve seat 102 of the valve element 106, the worm gear 122 stops rotating. In addition, as the drive mechanism 108 continues rotating the shaft 114, the worm screw 120 continues translating until the corresponding limit switch 130 opens.

Figure 4B:
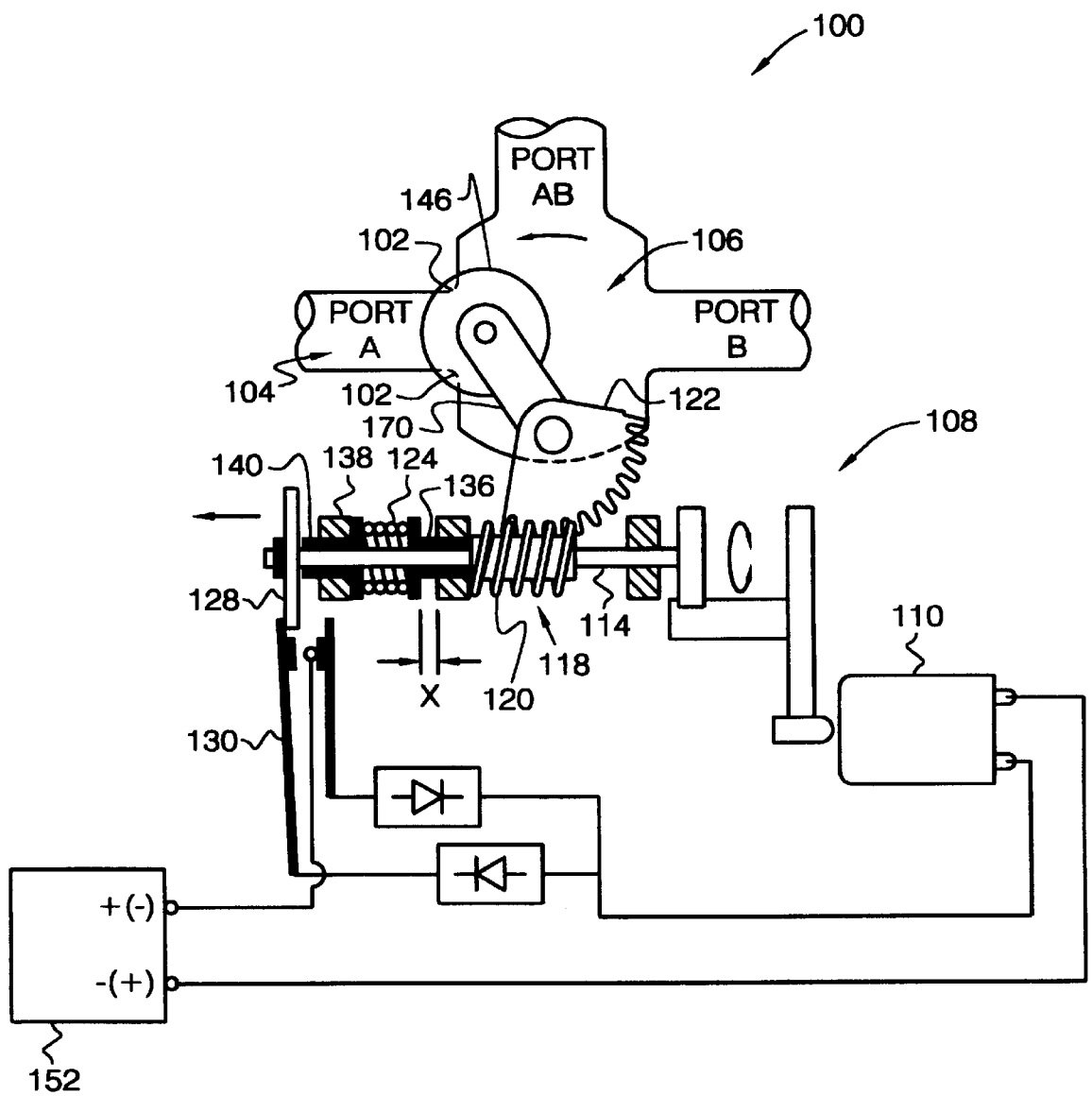

FIG. 4B illustrates the three-way valve apparatus 100, in accordance with the present invention, at a point when the valve element 106 has a closing force applied to it equal to the spring compression force modified through the ratio of the length of the worm gear 122, "D1" (FIG. 2), and the length of the valve element crank arm 170, "D2" (FIG. 2). The rotating worm screw 120 acts on the stationary worm gear 122, resulting in the worm screw 120 continuing to translate and thus compressing the spring 124 by acting on the first flanged sleeve 136. As the worm screw 120 and shaft 114 continue translating, the first flanged sleeve 136 compresses the spring against the flange of the second flanged sleeve 140, which is at rest against the second axial stop element 138. When the spring 124 compression reaches a predetermined compression force limit, the shaft 114 will have been displaced by a distance of "X", at which point the end plate 128 opens the first limit switch 130 to disconnect the power supply 152 to the motor 110 and de-energizing the motor 110, thus deactivating the drive mechanism 108.

The spring 124, under compression, applies a closing force acting through the first flanged sleeve 136 which in turn applies a force to the worm screw 120. The spring force being modified by the ratio of the length of the worm gear 122, "D1" (FIG. 2), and the length of the valve element crank arm 170, "D2" (FIG. 2), thereby translating the closing force to the valve seats 102. The spring force can be pre-set such that the gear assembly 118 locks into position and keeps the valve port closed even when the motor 110 is de-energized.

Figure 5:
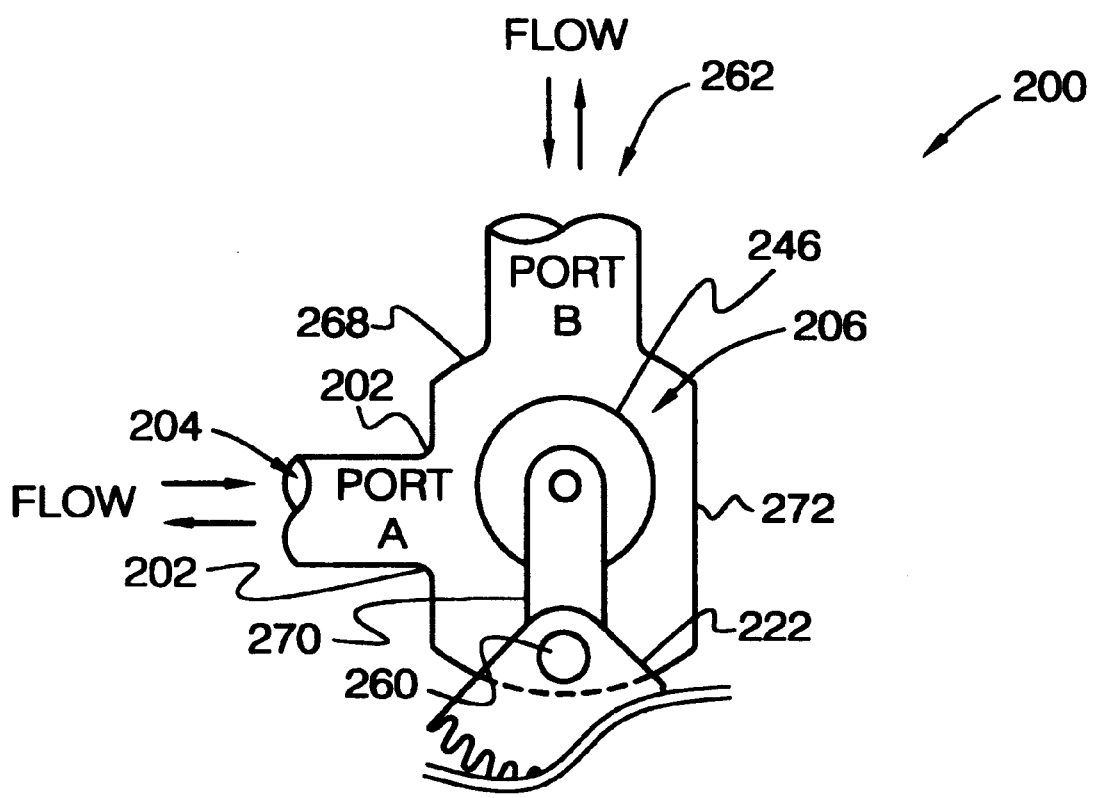
FIG. 5 illustrates an alternative embodiment of an electromechanical torque limiter for valve actuators showing a two-way hydronic valve.

FIG. 5 illustrates a two-way hydronic valve apparatus 200, in accordance with the present invention, in an open position with a valve housing 268 having a valve element 206 and flow passages comprising Port A 204 and Port B 262 therethrough. The valve element 206 comprises a valve element crank arm 270 having a first end coupled to a ball valve element 246, and a second end coupled to a worm gear 222. The valve element 206 is located within the housing 268 and is moveable about pivot point 260 between a valve seat 202 at Port A 204 and a mechanical stop 272. The valve element 206 is shown in an open position, in which case air or fluid flow may occur through the flow passages at Port A 204 and Port B 262, in either direction. It is appreciated that the same torque limiting mechanism according to present invention may be applied to the hydronic valve apparatus 200 as was applied to hydronic valve apparatus 100 (FIGS. 1, 2, 3, 4A and 4B). In addition, it is appreciated that the second flanged sleeve 140 (FIG. 1) and the second axial stop 138 (FIG. 1) would generally not be required in the two-way hydronic valve apparatus 200 because the closing force need only be applied to the valve element 206 against the valve seat 202 at Port A 204.

Of course, those skilled in the art will recognize that many modifications may be made through this configuration without departing from the spirit of the present invention. The above specification, examples, and data provide a complete description of the manufacture and use of the composition of the invention. Since many embodiments of the invention can be made without departing from the spirit and scope of the invention, the invention resides in the claims are hereinafter appended.

What is claimed is:

1. A valve apparatus, comprising:
    a valve housing having a valve seat, and a flow passage therethrough;
    a valve element moveable within the housing between an open position, in which fluid flow may occur through the flow passage, and a first closed position seated against the valve seat, in which fluid flow is blocked through the flow passage;
    a drive mechanism operatively connected to the valve element for moving the valve element between the open and closed positions, the drive mechanism including a motor for driving the mechanism, the drive mechanism including a shaft having a first and second end, the first end operatively coupled to the motor; and
    a torque limiting mechanism comprising at least one spring, an axial stop element disposed along the shaft and a sleeve slideably movable along a portion of the shaft;
    wherein the spring is configured to provide a closing force to the valve element operatively coupled to the drive mechanism, the torque limiting mechanism applies a closing force to the valve element when the valve element is seated against the valve seat, the sleeve is arranged to shift relative to the axial stop element and the axial stop element and the sleeve are operatively arranged to compress the spring.

2. The valve apparatus according to claim 1, wherein the drive mechanism further comprises a gear assembly operatively coupled between the motor and the first end of the shaft for providing rotational and translational motion along the axial length of the shaft.

3. The valve apparatus according to claim 1, wherein the torque limiting mechanism further comprises a sensor for sensing shaft displacement, the sensor controlling operation of the drive mechanism based on sensed shaft displacement.

4. The valve apparatus according to claim 3, wherein the sensor further comprises a plate fixedly mounted to the shaft adjacent to the second end thereof and at least one limit switch, the limit switch being engageable with the plate.

5. The valve apparatus according to claim 4, wherein the sensor further comprises a second limit switch engageable with the plate.

6. The valve apparatus according to claim 1, further comprising a second axial stop element disposed along the shaft and a second sleeve element slideably movable along a portion of the shaft, the second sleeve arranged to shift relative to the second axial stop element, the second axial stop element and the second sleeve operatively arranged to compress the spring.

7. The valve apparatus according to claim 6, wherein the spring is disposed between the two sleeves, the one sleeve compressing the spring in one direction and the second sleeve compressing the spring in the opposite direction.

8. The valve apparatus according to claim 1, wherein the drive mechanism further comprises a gear assembly operatively coupled between the shaft and the valve element.

9. The valve apparatus according to claim 8, wherein the gear assembly further comprises at least one worm screw connected to the shaft and at least one worm gear disposed on the valve element, and the worm screw operatively coupled to the worm gear.

10. The valve apparatus according to claim 1, wherein the valve housing further comprises a second flow passage and a second valve seat, and the valve element is movable within the housing between the open position and a second closed position seated against the second valve seat, in which fluid flow is blocked through the second flow passage, and the valve element is movable by the drive mechanism between the open position and the second closed position.

11. The valve apparatus according to claim 10, wherein the torque limiting mechanism applies a closing force to the valve element when the valve element is seated against the second valve seat.

12. A valve assembly comprising,
    a valve housing means having a flow passage extending therethrough;
    flow control means for controlling flow through the flow passage, the flow control means being movable between an open position allowing fluid flow through the flow passage and a closed position in which fluid flow is blocked through the flow passage;
    drive means engaged with the flow control means for moving the flow control means between the open and closed position, the drive means including a shaft having a first end and a second end, the first end operatively coupled to the drive means; and
    torque limiting means applying a closing force to the flow control means when the flow control means is at the closed position, the torque limiting means comprises at least one spring, an axial stop element disposed along the shaft and a sleeve slideably movable along a portion of the shaft; and
    wherein the spring is configured to provide a closing force to the valve element operatively coupled to the drive means, the torque limiting means applies a closing force to the valve element when the valve element is seated against the valve seat, the sleeve is arranged to shift relative to the axial stop element and the axial stop element and the sleeve are operatively arranged to compress the spring.

13. A valve apparatus, comprising:
    a valve housing having a valve seat, and a flow passage therethrough;

a valve element moveable within the housing between an open position, in which fluid flow may occur through the flow passage, and a first closed position seated against the valve seat, in which fluid flow is blocked through the flow passage;

a drive mechanism operatively connected to the valve element for moving the valve element between the open and closed positions, the drive mechanism comprising a motor for driving the mechanism; a shaft having a first end and a second end, the first end of the shaft operatively coupled to the motor; and a gear assembly operatively coupled between the motor and the first end of the shaft for providing rotational and translational motion along the axial length of the shaft; and a torque limiting mechanism comprising at least one spring, an axial stop element disposed along the shaft and a sleeve slideably movable along a portion of the shaft;

wherein the spring is configured to provide a closing force to the valve element operatively coupled to the drive mechanism, the torque limiting mechanism applies a closing force to the valve element when the valve element is seated against the valve seat, the sleeve is arranged to shift relative to the axial stop element and the axial stop element and the sleeve are operatively arranged to compress the spring.

14. The valve apparatus according to claim 13, further comprising a second axial stop element disposed along the shaft and a second sleeve element slideably movable along a portion of the shaft, the second sleeve arranged to shift relative to the second axial stop element, the second axial stop element and the second sleeve are operatively arranged to compress the spring.

15. The valve apparatus according to claim 14, wherein the spring is disposed between the two sleeves, the one sleeve compressing the spring in one direction and the second sleeve compressing the spring in the opposite direction.

16. A valve apparatus, comprising:

a valve housing having first and second valve seats, and first and second flow passages therethrough;

a valve element moveable within the housing between an open position, in which fluid flow may occur through the first flow passage, and a first closed position seated against the first valve seat, in which fluid flow is blocked through the first flow passage, and the valve element is movable within the housing between the open position and a second closed position seated against the second valve seat, in which fluid flow is blocked through the second flow passage;

a drive mechanism operatively connected to the valve element for moving the valve element between the open position and the first and the second closed positions, the drive mechanism including a motor for driving the mechanism; and a torque limiting mechanism operatively coupled to the drive mechanism and the valve element, the torque limiting mechanism applies a closing force to the valve element when the valve element is seated against first valve seat.

17. A valve apparatus according to claim 16, wherein the torque limiting mechanism applies a closing force to the valve element when the valve element is seated against the second valve seat.

18. A torque-operated load apparatus, comprising:

a torque-operated load element moveable from a first position to a second position;

a drive mechanism operatively connected to the torque-operated load element for moving the torque-operated load element between the first position and the second position, the drive mechanism including a motor for driving the mechanism, the drive mechanism including a shaft having a first and second end, the first end operatively coupled to the motor; and a torque limiting mechanism comprising at least one spring, an axial stop element disposed along the shaft and a sleeve slideably movable along a portion of the shaft;

wherein the spring is configured to provide a force to the torque-operated load element operatively coupled to the drive mechanism, the force moving the torque-operated load element from the first position to the second position, the torque limiting mechanism limiting the torque applied to the torque-operated load element when the torque-operated load element is at the second position, the sleeve is arranged to shift relative to the axial stop element and the axial stop element and the sleeve are operatively arranged to compress the spring.

* * * * *